United States Patent
Taniguchi et al.

(10) Patent No.: US 10,958,202 B2
(45) Date of Patent: Mar. 23, 2021

(54) CONTROL APPARATUS FOR THE ROTARY ELECTRICAL MACHINE

(71) Applicant: DENSO CORPORATION, Kariya (JP)

(72) Inventors: Makoto Taniguchi, Kariya (JP); Yuuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 16/511,779

(22) Filed: Jul. 15, 2019

(65) Prior Publication Data

US 2019/0341867 A1 Nov. 7, 2019

Related U.S. Application Data

(63) Continuation of application No. PCT/JP2018/000474, filed on Jan. 11, 2018.

(30) Foreign Application Priority Data

Jan. 13, 2017 (JP) .............................. JP2017-004229

(51) Int. Cl.
*H02P 21/30* (2016.01)
*H02P 27/12* (2006.01)
*H02K 21/04* (2006.01)

(52) U.S. Cl.
CPC ........... *H02P 21/30* (2016.02); *H02K 21/044* (2013.01); *H02P 27/12* (2013.01); *H02P 2207/05* (2013.01)

(58) Field of Classification Search
USPC ..... 318/400.02; 310/156.01, 156.66, 156.68, 310/156.69
See application file for complete search history.

(56) References Cited

U.S. PATENT DOCUMENTS

| 3,783,502 A * | 1/1974 | Richter ................. H02K 19/20 29/598 |
| 2013/0049653 A1* | 2/2013 | Katou .................... H02P 21/05 318/400.02 |
| 2015/0137648 A1* | 5/2015 | Kato ...................... H02K 1/276 310/156.53 |
| 2019/0131833 A1* | 5/2019 | Takahashi ............. H02K 19/22 |
| 2019/0334424 A1* | 10/2019 | Takahashi ............... H02K 1/27 |

FOREIGN PATENT DOCUMENTS

JP    H04-255451 A    9/1992

OTHER PUBLICATIONS

Apr. 3, 2018 International Search Report issued in International Patent Application PCT/JP2018/000474.

* cited by examiner

*Primary Examiner* — Jorge L Carrasquillo
(74) *Attorney, Agent, or Firm* — Oliff PLC

(57) ABSTRACT

A rotary electric machine is equipped with a stator and a rotor. The rotor has a d-axis magnetic circuit that is produced by a magnetomotive force of a field winding, and magnet magnetic circuits that are produced by a magnetic force of permanent magnets. The d-axis magnetic circuit and a q-axis magnetic circuit have at least a part thereof that is common to both. The permeance of the d-axis magnetic circuit is smaller than the permeance of the q-axis magnetic circuit, when a load is being applied to the rotor. A control apparatus of the rotary electric machine has a switching circuit that controls the field current in the field winding, and a control section that makes the switching frequency of the switching circuit become higher when the field current is above a threshold value than when the field current is less than or equal to the threshold value.

10 Claims, 7 Drawing Sheets

CONTROL APPARATUS FOR THE ROTARY ELECTRICAL MACHINE

CROSS-REFERENCE TO RELATED APPLICATION

The present application is a continuation application of International Application No. PCT/JP2018/000474, filed Jan. 11, 2018, which claims priority to Japanese Patent Application No. 2017-004229, filed Jan. 13, 2017. The contents of these applications are incorporated herein by reference in their entirety.

BACKGROUND

1. Technical Field

The present disclosure relates to technology for controlling a rotary electrical machine.

2. Related Art

Conventionally, there is has been proposed rotary electric machines having a stator and a rotor. The rotary electric machine has a rotor, a field core, a field winding and permanent magnets. The field core has cylindrical shaped boss portions that are fixedly attached to the shaft, disk portions that extend radially outward from the boss portions, and claw shaped poles disposed radially outwardly of the boss portions, extending from radial-direction tip parts of the disk portions along the axial direction.

SUMMARY

The present disclosure provides a control apparatus for the rotary electrical machine. In the present disclosure, a control apparatus controls a rotary electric machine with a stator having an annular shape stator and stator windings wound on the stator core, and having a rotor disposed radially inside and facing the stator. The rotor has a field core, a field winding, and permanent magnets. The field core has boss portions that are attached to the rotor axis, disk portions extending radially outward from axial-direction end parts of the boss portions, and a plurality of claw shaped poles that are disposed radially outwardly of the boss portions and that form magnetic poles which alternate in polarity in the circumferential direction of rotation. The field winding is disposed between the boss portions and the claw shaped poles, and generates a magnetomotive force through excitation. Each permanent magnet is disposed between a pair of claw shaped poles that are mutually adjacent with respect to the circumferential direction of rotation, with the direction of easy magnetization oriented in the circumferential direction of rotation, and is formed with magnetic polarities that coincide with magnetic polarities of the pair of claw shaped poles. The rotor has a d-axis magnetic circuit and a magnet magnetic circuit. In the d-axis magnetic circuit, a magnetic flux that is formed by excitation of the field winding flows in a path passing through the disk portion, the claw shaped poles, and the stator core. A magnetic flux that is formed by the permanent magnets flows in the magnet magnetic circuit. The d-axis magnetic circuit and the magnet magnetic circuit have, at least in part, a common circuit portion that is common to both of them. When a load is applied to the rotor, the magnetic flux that is formed by excitation of the stator windings is set such that a relationship Pst>Prt is established between the permeance Prt of the d-axis magnetic circuit and the permeance Pst of a q-axis magnetic circuit that passes through a q axis, where the q axis deviates by 90° in position from the d axis. The control apparatus of the rotary electric machine of the present disclosure is equipped with a switching circuit and a control section. The switching circuit controls excitation of the field winding. When the excitation current that flows in the field winding exceeds a threshold value, the control section increases the switching frequency of changeover between the on/off conditions of the switching circuit, relative to the switching frequency when the excitation current is less than or equal to the threshold value.

DETAILED DESCRIPTION OF THE PREFERRED EMBODIMENTS

Figure 1:
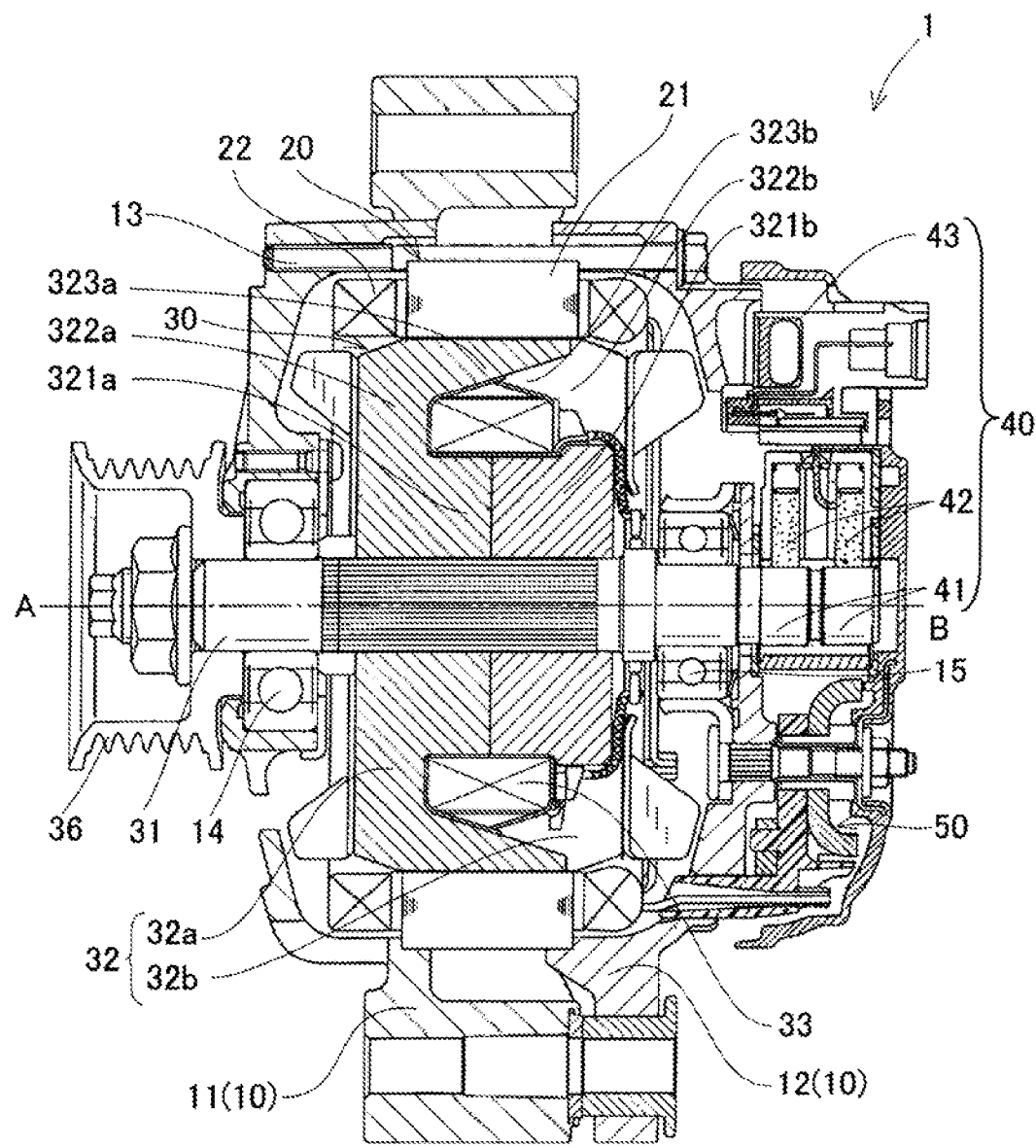
FIG. 1 is a cross-sectional view of a rotary electric machine according to a first embodiment, taken in a plane parallel to the axial direction.

Rotary electric machines having a stator and a rotor are known (for example in JP H04-255451 A, etc.). The rotary electric machine disclosed in JP H04-255451 A has a rotor, a field core, a field winding and permanent magnets. The field core has cylindrical shaped boss portions that are fixedly attached to the shaft, disk portions that extend radially outward from the boss portions, and claw shaped poles disposed radially outwardly of the boss portions, extending from radial-direction tip parts of the disk portions along the axial direction. The claw shaped poles are disposed at prescribed angular position around the circumferential rotation direction. A plurality of claw shaped poles are provided, disposed such that the polarities of magnetic poles of the claw shaped poles successively alternate around the circumferential rotation direction. The field winding is disposed between the boss portions and the claw shaped poles, and produces a magnetomotive force by excitation. Each permanent magnet is disposed between a pair of claw shaped poles that are mutually adjacent with respect to the circumferential rotation direction, with the direction of easy magnetization oriented in the circumferential rotation direction. In addition, the polarities of the magnetic poles of the permanent magnet are formed such as to coincide with the respective polarities that are induced, by a magnetomotive force produced by the field winding, in the pair of claw shaped poles that are mutually adjacent with respect to the circumferential rotation direction.

The permanent magnets form two magnet magnetic circuits. Specifically, there is a first magnet magnetic circuit through which passes a magnetic flux that interlinks the stator, and a second magnet magnetic circuit through which flows a magnetic flux that passes via the boss portions, with the circuit being completed within the rotor. Furthermore, when a load is being applied to the rotor, the magnetic flux that is formed by the magnetomotive force produced by the field winding forms a d-axis magnetic circuit that passes through the boss portions and the disk portions of the field core, through a pair of the claw shaped poles, and through the stator core. Here, the phrase "when a load is being applied to the rotor" signifies a time at which a field current is being passed through the field winding. Of the above-described two magnet magnetic circuits, the flow of magnetic flux through the second magnet magnetic circuit is in the opposite direction to the magnetic flux in the d-axis magnetic circuit. Hence, there is high reluctance to the flow of magnetic flux through the second magnet magnetic circuit, producing a condition in which is difficult for that magnetic flux to flow.

It will be assumed that there is a relationship Pst>Prt established between the permeance Prt of the d-axis magnetic circuit and the permeance Pst of the q-axis magnetic circuit. In this case the amount of magnet magnetic flux that flows in the above-described first magnet magnetic circuit will be increased. Hence the magnet magnetic flux of the permanent magnets will be effectively used, so that the level of power that can be generated by the rotary electric machine will be greatly increased. The following can be envisaged as specific means for achieving this. For example, the claw shaped poles, the boss portions and the disk portions can be integrally formed of the same soft magnetic material. Then, with two formed bodies brought together in a matched condition, the boss portions, or all or part of the disk portions, are made thin. The magnetic path cross-sectional area can thereby be reduced, so that saturation of the magnetic flux will readily occur when the field current is increased. By using such a method, it can be made difficult for the magnet magnetic flux of the permanent magnets to pass through the boss portion side, and hence it will readily become interlinked with the stator.

Inductance is a quantity that can be defined as being proportional to permeance. Furthermore the permeance Prt of the d-axis magnetic circuit varies dynamically, between the case in which the load is high (Pst>Prt) and the case in which the load is low (Pst Prt), there is a big difference between them. With such a magnetic circuit, this signifies that the inductance at the d axis side varies dynamically to produce two situations in accordance with variation of the load condition. That is to say, in the case of a magnetic circuit having the above characteristics, this signifies that the inductance of the field winding varies dynamically in accordance with the load condition. That is, the inductance of that magnetic circuit becomes decreased when the load is high and becomes increased when the load is low.

In general, the time constant $\tau$ of a resistance-inductance LR circuit is expressed as $\tau=L/R$. The resistance R of the field winding is not changed greatly by variations in the load condition. That is to say, the variation due to self-heating is within a range that is extremely small by comparison with the variation of the inductance L. Hence if the inductance L varies dynamically, then the time constant $\tau$ will vary dynamically. For that reason, the stability of control of the field current of the rotary electric machine is adversely affected. As a result, the voltage that is generated by the rotary electric machine cannot be controlled stability, and it can be expected that large variations in voltage will occur.

When controlling a circuit having a small value of the time constant $\tau$, ensuring stability of control of the field current is most easily achieved by increasing the switching frequency. However as described above, in the case of a circuit configured such that the time constant $\tau$ varies from time to time, if the switching frequency is usually set to a high value, then switching losses will be produced when the time constant $\tau$ becomes large. Thus with the above policy, the stress on the switch elements will become high, and it will become necessary to take separate steps for enhancing heat dissipation countermeasures and for increasing durability.

The present disclosure provides a control technology for a rotary electric machine that enables achievement of both stability of controlling the field current in a field winding when the circuit time constant of the field winding is small, and also a reduction of switching losses when the circuit time constant is large.

A control apparatus that is an aspect of the technology of the present disclosure controls a rotary electric machine with a stator having an annular shape stator and stator windings wound on the stator core, and having a rotor disposed radially inside and facing the stator. The rotor has a field core, a field winding, and permanent magnets. The field core has boss portions that are attached to the rotor axis, disk portions extending radially outward from axial-direction end parts of the boss portions, and a plurality of claw shaped poles that are disposed radially outwardly of the boss portions and that form magnetic poles which alternate in polarity in the circumferential direction of rotation. The field winding is disposed between the boss portions and the claw shaped poles, and generates a magnetomotive force through excitation. Each permanent magnet is disposed between a pair of claw shaped poles that are mutually adjacent with respect to the circumferential direction of rotation, with the direction of easy magnetization oriented in the circumferential direction of rotation, and is formed with magnetic polarities that coincide with magnetic polarities of the pair of claw shaped poles. The rotor has a d-axis magnetic circuit and a magnet magnetic circuit. In the d-axis magnetic circuit, a magnetic flux that is formed by excitation of the field winding flows in a path passing through the disk portion, the claw shaped poles, and the stator core. A magnetic flux that is formed by the permanent magnets flows in the magnet magnetic circuit. The d-axis magnetic circuit and the magnet magnetic circuit have, at least in part, a common circuit portion that is common to both of them. When a load is applied to the rotor, the magnetic flux that is formed by excitation of the stator windings is set such that a relationship Pst>Prt is established between the permeance Prt of the d-axis magnetic circuit and the permeance Pst of a q-axis magnetic circuit that passes through a q axis, where the q axis deviates by 90° in position from the d axis. The control apparatus of the rotary electric machine of the present disclosure is equipped with a switching circuit and a control section. The switching circuit controls excitation of the field winding. When the excitation current that flows in the field winding exceeds a threshold value, the control section increases the switching frequency of changeover between the on/off conditions of the switching circuit, relative to the switching frequency when the excitation current is less than or equal to the threshold value.

With this configuration of the rotary electric machine of the present disclosure, two magnet magnetic circuits are formed by the magnetic force of the permanent magnets that are disposed between claw shaped poles which are mutually adjacent with respect to the circumferential direction of rotation of the rotor. Specifically, a first magnet magnetic circuit is formed in which magnetic flux flows that is interlinked with the stator, and a second magnet magnetic circuit in which a flow of magnetic flux that passes through the boss portions is completed within the rotor. With the rotary electric machine of the present disclosure, a d-axis magnetic circuit is formed when a load is applied to the rotor. Here, the phrase "when a load is being applied to the rotor" signifies a time at which a field current is being passed through the field winding. In the d-axis magnetic circuit, the magnetic flux that is formed by the excitation of the field winding flows through the boss portions and disk portions of the field core, a pair of the claw shaped poles, and the stator core. At that time, of the two magnet magnetic circuits, the flow of magnet magnetic flux via the second magnet magnetic circuit is in the opposite direction to the flow of magnetic flux via the d-axis magnetic circuit. Hence there is high reluctance, making it difficult for the flux to flow. Furthermore the permeance Prt of the d-axis magnetic circuit is smaller than the permeance Pst of the q-axis magnetic circuit (Pst>Prt). Hence, of the two magnet magnetic circuits, the magnet magnetic flux in the first magnet magnetic circuit becomes increased. As a result, with the rotary electric machine of the present disclosure, the electric power generation capability is greatly increased through effectively using magnet magnetic flux. Furthermore with the rotary electric machine of the present disclosure, when the field current exceeds a predetermined threshold value, the switching frequency of the field current is made higher than when the field current is less than or equal to the threshold value. As a result, with the rotary electric machine of the present disclosure, stability of control of the field current can be ensured during a high saturation state, in which the field current is high and the circuit time constant is small. Furthermore in a low saturation state in which the field current is low and the circuit time constant is large, switching losses are reduced by lowering the switching frequency.

With a control apparatus of a rotary electric machine of the present disclosure, the threshold values consist of a first threshold value and a second threshold value. The first threshold value is a threshold value for changing the switching frequency from a high value to a low value. The second threshold value is a threshold value for changing the switching frequency from a low value to a high value. The first threshold value is smaller than the second threshold value. Due to this configuration of the control apparatus of the rotary electric machine of the present disclosure, it becomes possible to prevent changeover hunting of the switching frequency, caused by variations in the field current when the field current is close to a threshold value. Occurrence of a voltage hunting phenomenon at these changeover timings can thereby be suppressed.

In a control apparatus of a rotary electric machine of the present disclosure, a switching circuit has a switch element and a reverse current diode. The switch element is connected in series with the field winding. The reverse current diode is connected in parallel with the field winding. With this configuration, the control apparatus of the rotary electric machine of the present disclosure can discharge magnetic energy stored in the field winding to the exterior, as current that passes through the reverse current diode. Hence the output voltage is maintained when the switch element is set to the off state.

With a control apparatus of a rotary electric machine of the present disclosure, the switching circuit has a first switch element and a second switch element. The first switch element is connected in series with the field winding. The second switch element is connected in parallel with the field winding. The switching circuit is a synchronous rectifier form of circuit, which performs conduction control by complementary operation of the first switch element and second switch element. Due to this configuration, the control apparatus of a rotary electric machine of the present disclosure can reduce switching losses that occur when a return current flows, by comparison with a configuration in which a reverse current diode is used. Hence, thermal stress becomes suppressed. It should be noted that the condition "when a return current flows" corresponds to a time at which the magnetic energy stored in the field winding is discharged as current.

With a control apparatus of a rotary electric machine of the present disclosure, the switch elements are MOSFETs. Due to this configuration, the control apparatus of a rotary electric machine of the present disclosure can reduce switching losses that occur during conduction, by comparison with the case in which the switch elements are configured as bipolar switch elements such as IGBTs (Insulated Gate Bipolar Transistors). Furthermore since this facilitates high-speed switching, changeover of the switching frequency can be appropriately performed.

A control apparatus of a rotary electric machine of the present disclosure includes a capacitor. The capacitor is connected in parallel with the switching circuit. With this configuration, the control apparatus of a rotary electric machine of the present disclosure can suppress variations in the field voltage of the field winding. The field voltage is thereby stabilized.

A control apparatus of a rotary electric machine of the present disclosure is equipped with an inverter. The stator windings are polyphase windings. The inverter controls excitation of the polyphase winding. The switching frequency of the switching circuit is lower than an on/off switching frequency of the inverter. With this configuration, the control apparatus of a rotary electric machine of the present disclosure can suppress electromagnetic interference with the inverter, caused by fields. Furthermore the switching losses at the field winding side are reduced. Thus, the thermal load on the inverter can be reduced.

With a control apparatus of a rotary electric machine of the present disclosure, the switching circuit is connected in parallel between the positive terminal and negative terminal of the inverter. With this configuration, the overall system of the rotary electric machine can be made compact.

With a control apparatus of a rotary electric machine of the present disclosure, a relationship Pst>Prt is set by adjusting the cross-sectional area of a magnetic path in at least a part of the field core. With this configuration, the control apparatus of a rotary electric machine of the present disclosure can set the relationship Pst>Prt by changing the shape of at least a part of the field core. Hence that relationship can be established by using a simple method.

Specific embodiments of a control apparatus for a rotary electric machine that is an aspect of the technology of the present disclosure will be described referring to FIGS. 1 to 13.

First Embodiment

<Configuration of Rotary Electric Machine>

With the present embodiment, a rotary electric machine 1 is installed on a vehicle etc., for example. The rotary electric machine 1 generates motive power for driving the vehicle, by means of electric power that is supplied from a power source such as a battery, etc. The rotary electric machine 1 can also generate electric power for charging the battery, by means of motive power that is supplied from the engine of the vehicle. That is to say, the rotary electric machine 1 can be a vehicle motor-generator. As shown in FIG. 1, the rotary electric machine 1 is equipped with a housing 10, a stator 20, a rotor 30, a field winding excitation apparatus 40 and a rectifier apparatus 50.

The housing 10 has a front housing 11 and a rear housing 12. The front housing 11 and rear housing 12 are each formed of cylindrical shape with a bottom, open at one end. The front housing 11 and rear housing 12 are connected by bolts 13, with the open parts joined together.

Figure 4:
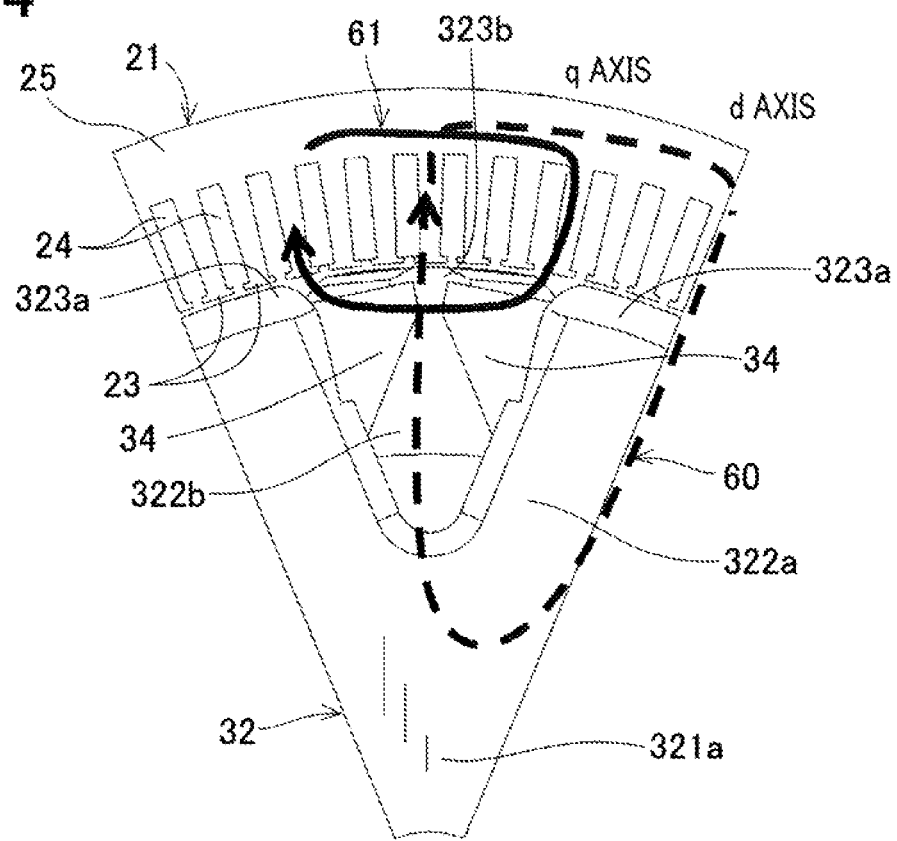
FIG. 4 is a partial plan view of the rotor and of a stator of the rotary electric machine of the first embodiment.
Figure 5:
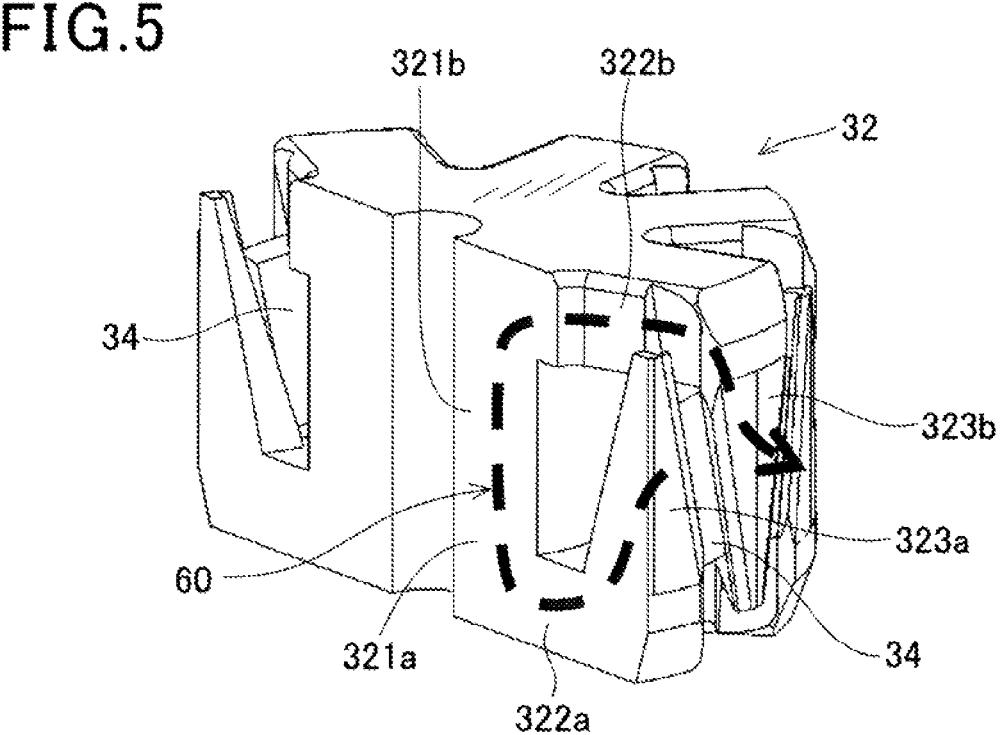
FIG. 5 is a diagram illustrating a flow of magnetic flux at the field core side of a d-axis magnetic circuit that is formed in the rotary electric machine of the first embodiment.
Figure 6:
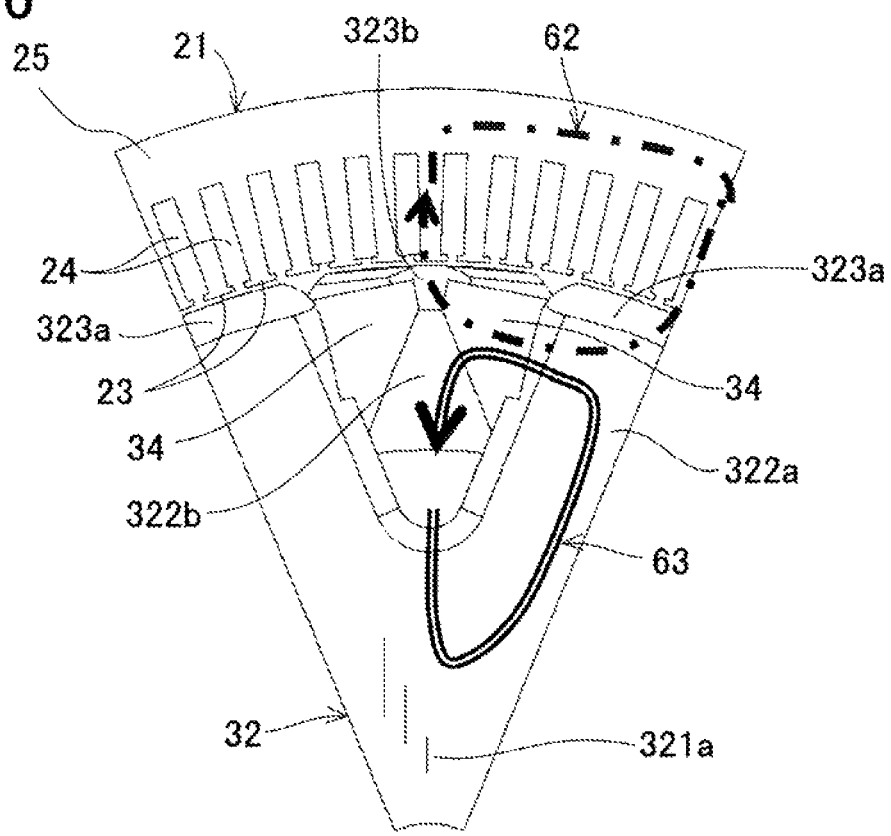
FIG. 6 is a diagram illustrating two magnet magnetic circuits that are formed by permanent magnets, in the rotary electric machine of the first embodiment.

The stator 20 has a stator core 21 and stator windings 22. The stator core 21 is formed in an annular shape. As shown in FIG. 4, the stator core 21 has teeth 23 and slots 24. The teeth 23 are a plurality of teeth that are arrayed circumferentially, extending radially inward from the radial inner face of the annular part. The slots 24 are recesses that are each provided between a pair of the teeth 23 that are circumferentially adjacent to one another. The stator core 21 is held between the circumferential inner faces of the front housing 11 and rear housing 12, enclosed with respect to the axial direction.

The stator windings 22 are wound on the stator core 21. Specifically, the stator windings 22 are wound around the teeth 23 of the stator core 21. The stator windings 22 have straight-shape slot housing portions and curved coil end portions. The slot housing portions are housed within the slots 24 of the stator core 21. The coil end portions are portions which protrude outward from the axial-direction ends of the stator core 21. The stator windings 22 consists of polyphase windings, equal in number to the number of phases of the rotary electric machine 1. The stator windings 22 of this embodiment are 3-phase windings.

<Configuration of Rotor>

The rotor 30 is disposed facing the stator 20 radially inwardly. Specifically the rotor 30 is positioned facing, and radially inward from, the tips of the teeth of the stator 20. A prescribed gap is provided between the stator 20 and the rotor 30. The rotor 30 is rotatably disposed radially inwardly of the stator 20.

Figure 2:
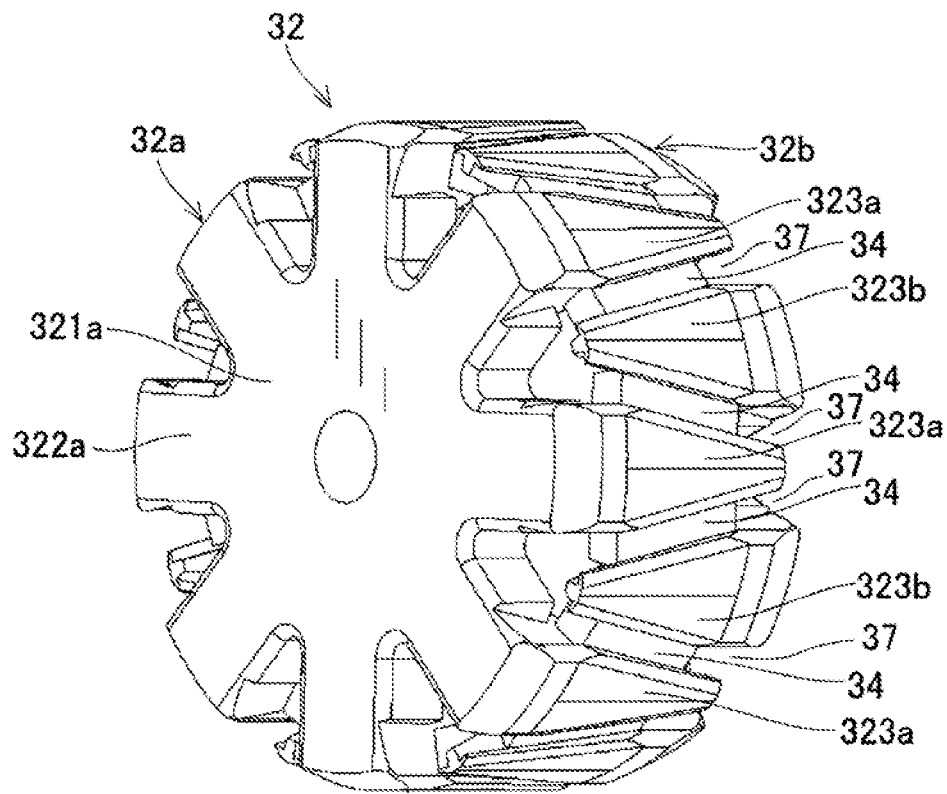
FIG. 2 is a perspective view of a rotor that is installed on the rotary electric machine of the first embodiment.
Figure 3:
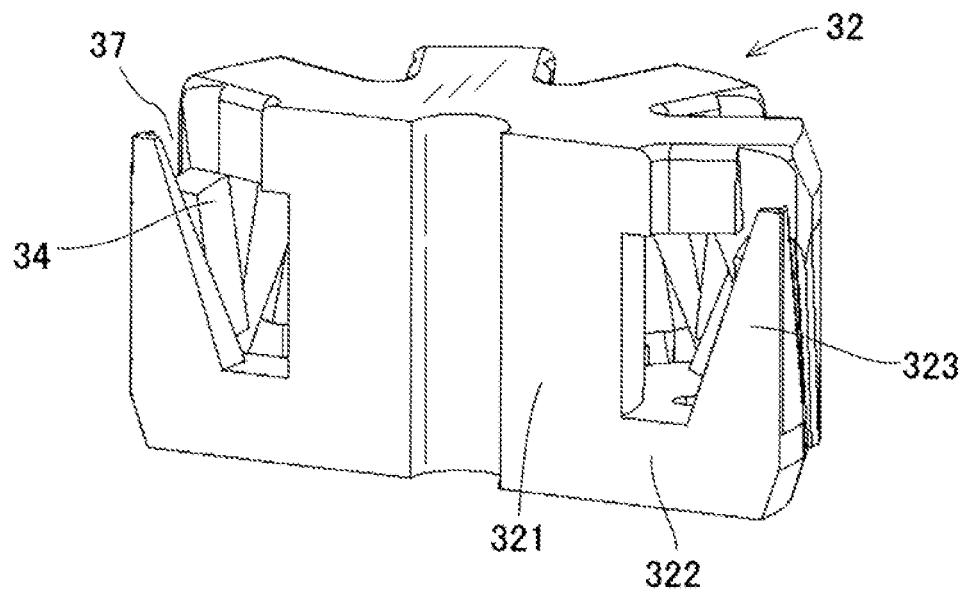
FIG. 3 is a perspective view of the rotor that is installed on the rotary electric machine of the first embodiment, showing a cross-sectional view taken in a plane parallel to the axial direction.

The rotor 30 of this embodiment is a Lundell type of rotor. As shown in FIGS. 1 to 3, the rotor 30 has a field core 32, a field winding 33, and permanent magnets 34. The shaft 31 is rotatably supported by a pair of bearings 14 and 15 in the housing 10. The rotor 30 is driven for rotation by a vehicle engine, via a pulley 36 that is tightened and attached to the shaft 31. The field winding 33 is wound around the outer circumference of the boss portions 321 of the field core 32.

The field core 32 is a Lundell type of field core, that is axially divided into pair of pole cores 32a, 32b. In the following, the into pair of pole cores 32a, 32b are designated as the first pole core 32a and the second pole core 32b. Each of the first pole core 32a and the second pole core 32b is formed, for example by forging, of a soft magnetic material. The first pole core 32a and the second pole core 32b have mutually identical shapes. The first pole core 32a is fixed to a first end (the end "A" in FIG. 1) of the shaft 31 of the rotor 30. The second pole core 32b is fixed to a second end (the end "B" in FIG. 1) of the shaft 31 of the rotor 30.

As shown in FIG. 3, each of the first pole core 32a and the second pole core 32b has a boss portion 321, a disk portion 322, and claw shaped poles 323. Specifically, the first pole core 32a has a first boss portion 32a, a first disk portion 322a, and first claw shaped poles 323a. The second pole core 32b has a second boss portion 321b, a second disk portion 322b, and second claw shaped poles 323b. Each of the first boss portion 321a and second boss portion 321b is an annular shape member having a shaft hole through which the shaft 31 of the rotor 30 can be inserted. The first boss portion 321a and the second boss portion 321b are components that are fitted to, and fixed on, the outer circumference of the shaft 31 of the rotor 30. In the first boss portion 321a and second boss portion 321b, a field flux flows along the axial direction, radially inwardly of the field winding 33.

The first disk portion 322a is a disk-shaped part that spreads radially outward from an axial-direction first end of the first boss portion 321a (the end A shown in FIG. 1). Furthermore the first disk portion 322a has parts that extend radially outward, positioned with a prescribed angular pitch in the circumferential direction of rotation of the rotor 30. The second disk portion 322b is a disk-shaped part that spreads radially outward from an axial-direction second end of the first boss portion 321b (the end B shown in FIG. 1). Furthermore the second disk portion 322b has parts that extend radially outward, positioned with a prescribed angular pitch in the circumferential direction of rotation of the rotor 30. The field flux flows in a radial direction in the first disk portion 322a and the second disk portion 322b.

The first claw shaped poles 323a extend in the axial direction from radial-direction tip parts of the first disk portion 322a to the axial-direction second end (the end B shown in FIG. 1), and are disposed radially outwardly of the first boss portion 321a. The second claw shaped poles 323b extend in the axial direction, from radial-direction tip parts of the second disk portion 322b to the axial-direction first end (the end A shown in FIG. 1), and are disposed radially outwardly of the second boss portion 321b. The first claw shaped poles 323a and the second claw shaped poles 323b are disposed such as to extend in the axial direction, radially outwardly of the field winding 33. Magnetic flux is exchanged between the stator core 21 and the first claw shaped poles 323a and second claw shaped poles 323b.

A plurality of first claw shaped poles 323a and a plurality of second claw shaped poles 323b, identical in number (for example, 8 of each) are respectively provided around the circumferential direction of rotation of the rotor 30. The first pole core 32a and the second pole core 32b are arranged with the axial-direction end faces thereof in contact, such that the first claw shaped poles 323a and the second claw shaped poles 323b alternately face one another. The first claw shaped poles 323a and the second claw shaped poles 323b are disposed with interstitial spaces 37 between them, around the circumferential direction of rotation of the rotor 30, as shown in FIGS. 2 and 3. The first claw shaped poles 323*a* and the second claw shaped poles 323*b* alternate around the circumferential direction of rotation of the rotor 30 such that the axial-direction base ends (axial-direction tip ends) that connect to the disk portions 322*a*, 322*b* are mutually opposite with respect to the axial direction. The first claw shaped poles and second claw shaped poles 323*a*, 323*b* are formed with mutually opposite polarities (specifically, S polarity and N polarity).

Each of the first claw shaped poles and second claw shaped poles 323*a*, 323*b* have a predetermined width with respect to the circumferential direction of rotation of the rotor 30 (predetermined circumferential width). Furthermore each of the first claw shaped poles and second claw shaped poles 323*a*, 323*b* has a prescribed thickness (prescribed radial-direction thickness). Each of the first claw shaped poles and second claw shaped poles 323*a*, 323*b* is formed in the following way. Each of the first claw shaped poles and second claw shaped poles 323*a*, 323*b* is formed such that the circumferential width in the circumferential direction and the thickness in the radial direction gradually decrease, from the base end in the vicinity of the connecting parts of the disk portions 322*a*, 322*b* to the axial-direction tip end. That is to say, the first claw shaped poles and second claw shaped poles 323*a*, 323*b* are formed such as to become gradually narrower, in both the radial direction and the circumferential direction, in accordance with increasing closeness to the axial-direction tip end. It should be noted that each of the first claw shaped poles and second claw shaped poles 323*a*, 323*b* is preferably formed such as to be symmetrical about a circumferential-direction center, with respect to the circumferential direction of rotation of the rotor 30.

Each of the interstitial spaces 37 is provided between a pair of first claw shaped poles 323*a* and second claw shaped poles 323*b* that are mutually adjacent with respect to the circumferential direction of rotation of the rotor 30. The interstitial spaces 37 extend in an oblique axial direction. The interstitial spaces 37 slope at a prescribed angle with respect to the shaft 31 of the rotor 30, from one axial-direction end to the opposite axial-direction end. Each of the interstitial spaces 37 is set such that the size in the circumferential direction of rotation of the rotor 30 (the circumferential-direction dimension) does not change significantly in accordance with axial-direction position. That is to say, the circumferential-direction dimension is fixed at a constant value, or is maintained within a very small range which contains that constant value. A permanent magnet 34 is disposed in each of the interstitial spaces 37.

The field core 32 is formed of two types of material which have respectively different values of saturation magnetic flux. Specifically, of the field cores 32, the claw shaped poles 323*a*, 323*b*, the boss portions 321*a*, 321*b*, and the disk portions 322*a*, 322*b*, are formed of materials which have respectively different values of saturation magnetic flux. The claw shaped poles 323*a*, 323*b* are formed of a first material. The boss portions 321*a*, 321*b*, and the disk portions 322*a*, 322*b*, are formed of a second material, which has a lower value of saturation magnetic flux than that of the first material.

The first material could be for example S10C having a carbon content of 0.1%, while the second material could for example be a material having a relatively high carbon content, such as S45C. Furthermore, SUS430, or electromagnetic steel sheets, etc., could be utilized as a material having a lower saturation magnetic flux than S10C. The second material has a high permeance by comparison with the first material. Examples of material having high permeance include permalloy, iron with nickel cobalt added, etc. Of these, permalloy is preferable as the second material.

In general, the permeance P of a magnetic circuit is expressed by equation (1) below, using the permeability µ, the magnetic path cross-sectional area A and the magnetic path length L. The permeability µ varies in accordance with the state of magnetic saturation of the magnetic circuit. The permeability µ, under a condition of low magnetic saturation, has a magnitude that is of the order of several thousand times to ten thousand times the permeance of air. On the other hand in a state of high saturation, the permeability µ is several times the permeance of air.

$$P = \mu \times A/L \tag{1}$$

The field winding 33 is wound on the outer circumferential side of the boss portions 321*a* and 321*b* of the field cores 32*a*, 32*b*, in a condition of being insulated from the field cores 32. The field winding 33 is disposed within a space that opens in the radial direction between the first boss portion 321*a* and the first claw shaped poles 323*a* of the first pole core 32*a* and a space that opens in the radial direction between the second boss portion 321*b* and the second claw shaped poles 323*b* of the second pole core 32*b*. The field winding 33 is a coil that generates a magnetizing force in the first boss portion 321*a* and the second boss portion 321*b* through excitation by a DC field current (excitation current) If. The magnetic flux generated by the field winding 33 is led through the first disk portion 322*a* and the second disk portion 322*b* from the first boss portion 321*a* and second boss portion 321*b* to the first boss portion 321*a* and second boss portion 321*b*. The field winding 33 magnetizes the first claw shaped poles 323*a* with the N polarity and magnetizes the second claw shaped poles 323*b* with the S polarity.

The generated magnetic flux passes through the boss portions 321*a*, 321*b*, the disk portions 322*a*, 322*b*, and the claw shaped poles 323*a*, 323*b*. That magnetic flux forms a d-axis magnetic circuit 60. As shown by the broken-line portions in FIGS. 4 and 5, the magnetic flux passes through a magnetic circuit having the following form of path. Firstly, the magnetic flux passes from the teeth 23 of the stator core 21 to the first claw shaped poles 323*a* of the field core 32. The magnetic flux then passes along a path: first disk portion 322*a*→first boss portion 321*a*→second boss portion 321*b*→second disk portion 322*b*→second claw shaped poles 323*b*. The magnetic flux then returns to the stator core 21 from the teeth 23, at a position displaced by the amount of one magnetic pole of the stator core 21. Thereafter, the magnetic flux passes through the back core 25, and reaches d-axis teeth 23 at a position displaced by the amount of one magnetic pole. This d-axis magnetic circuit 60 is a magnetic circuit that generates a counter electromotive force in the rotor 30.

Furthermore a current flows in the stator windings 22 as a result of the magnetic flux in the d-axis magnetic circuit 60, and of the magnetic flux in a first magnet magnetic circuit 62 (described in the following) which is interlinked with the stator 20. Due to this, a q-axis magnetic circuit 61 is formed. As shown in FIG. 4, the q-axis magnetic circuit 61 is formed by the passage of magnetic flux along a q-axis that deviates by an electrical angle of 90° from the d-axis of the stator core 21. The permeance Prt of the d-axis magnetic circuit 60 and the permeance Pst of the q-axis magnetic circuit 61 are set such as to establish the relationship of equation (2) below when a load is applied to the rotor 30. That is to say, when a field current If is passed through the field winding 33, the relationship of equation (2) is established. Here, the permeances Prt and Pst are inverse values of magnetic reluctance.

$$Pst > Prt \qquad (2)$$

When a load is being applied to the rotor 30, the value of field current If that is passed through the field winding 33 as the rated current value is generally within a range of (4 [A]≤If≤20 [A]), as determined by the state of the brushes of the vehicle. If the performance of the brushes is high, then the value of the field current If at that time could for example be 30 [A]. Furthermore if a brushless configuration is used, whereby there is no limit on the field current If, then the current could exceed the above range. That is to say, in this case, the value of the field current If could be made such that the relationship Pst>Prt is satisfied.

As shown in FIGS. 2 and 3, the permanent magnets 34 are respectively disposed in the interstitial spaces 37 provided between the first claw shaped poles 323a and the second claw shaped poles 323b. That is to say, the number of permanent magnets 34 is the same as the number of interstitial spaces 37. The permanent magnets 34 are of substantially oblong rectangular shape. The permanent magnets 34 are positioned such as to slope at an inclination with respect to the axial direction, in the same way as for the interstitial spaces 37. The permanent magnets 34 thus slope from one axial-direction end to the opposite axial-direction end at a prescribed angle with respect to the shaft 31 of the rotor 30. The permanent magnets 34 have a function of decreasing the leakage of flux from between first claw shaped poles 323a and second claw shaped poles 323b that are adjacent to one another in the circumferential direction of rotation of the rotor 30. The permanent magnets 34 thereby serve to strengthen the magnetic flux between the claw shaped poles 323a, 323b and the stator core 21 of the stator 20.

The permanent magnets 34 are disposed such that the magnetic poles face in directions which reduce the leakage of magnetic flux from between the claw shaped poles 323a, 323b. The permanent magnets 34 are disposed with the axis of easy magnetization oriented in the circumferential direction of rotation of the rotor 30. Specifically, the permanent magnets 34 are disposed at a prescribed angle of inclination with respect to the circumferential direction of rotation of the rotor 30. Magnetic pole portions of a permanent magnet 34, which are on respectively opposite sides with respect to the circumferential direction of rotation, are held facing, or in a state of contact with, circumferential-direction side faces of claw shaped poles 323a, 323b. The permanent magnets 34 have magnetic poles formed such as coincide with the polarities produced in the claw shaped poles 323a, 323b by the magnetizing force of the field winding 33. That is to say, each permanent magnet 34 is formed such that the N pole of that magnet is disposed circumferentially opposite a first claw shaped pole 323a that is magnetized with N polarity. Furthermore, each permanent magnet 34 is formed such that the S pole of that magnet is disposed circumferentially opposite a first claw shaped pole 323b that is magnetized with S polarity.

In this way with the field core 32 of this embodiment, as a result of the arranging and forming of the permanent magnets 34, two magnet magnetic circuits 62, 63 are formed in each of the permanent magnets 34. As shown by the single broken line portion in FIG. 6, of the two magnet magnetic circuits, the first magnet magnetic circuit 62 is a magnetic circuit in which a magnetic flux flows that is interlinked with the stator 20. As shown by the double bold line portion in FIG. 6, of the two magnet magnetic circuits, the second magnet magnetic circuit 63 is a magnetic circuit in which magnetic flux flows through the boss portions 321a, 321b and the disk portions 322a, 322b, and in which the circuit is completed within the rotor 30. With these magnet magnetic circuits, the second magnet magnetic circuit 63, that passes through the boss portions 321a, 321b, is a magnetic circuit in which a magnet magnetic flux flows that has no effect upon the stator 20. As opposed to this, the first magnet magnetic circuit 62 is a magnetic circuit through which a magnet magnetic flux flows that is interlinked with the stator 20, and develops a counter electromotive force and torque.

The first magnet magnetic circuit 62 and the d-axis magnetic circuit 60 have a common circuit portion that is common to at least a part of them. Specifically, the common circuit portion is a magnetic circuit that passes from the second claw shaped poles 323b through the stator 20, reaching the first claw shaped poles 323a. That magnetic circuit is common to the first magnet magnetic circuit 62 and the d-axis magnetic circuit 60. The second magnet magnetic circuit 63 and the d-axis magnetic circuit 60 have a common circuit portion that is common to at least a part of them. Specifically, the common circuit portion is a magnetic circuit through the boss portions 321a, 321b and the disk portions 322a, 322b. That magnetic circuit is common to the second magnet magnetic circuit 63 and the d-axis magnetic circuit 60.

<Configuration of Control Apparatus>

Figure 7:
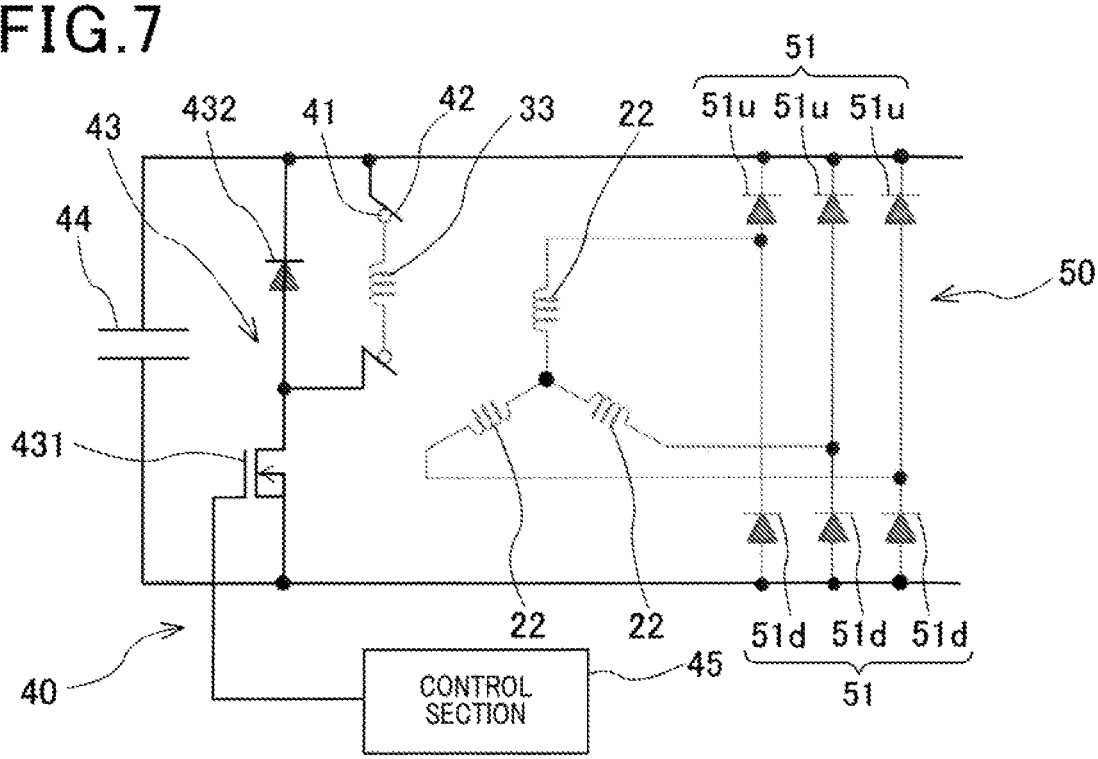
FIG. 7 is a circuit diagram of a control apparatus of the rotary electric machine of the first embodiment.

The field winding power supply apparatus 40 is an apparatus for supplying power to the field winding 33. The field winding power supply apparatus 40 corresponds to a control apparatus of the rotary electric machine 1 of the present embodiment. As shown in FIGS. 1 and 7, the field winding power supply apparatus 40 has slip rings 41, brushes 42 and a regulator 43. The slip rings 41 are fitted on, and attached to, a first axial-direction end (the end B as shown in FIG. 1) of the shaft 31 of the rotor 30. The slip rings 41 have function of supplying DC current to the field winding 33 of the rotor 30. Two brushes 42 are provided. The brushes 42 are retained in brush holders that are fixedly attached to the housing 10. Two slip rings 41 are provided, corresponding to the brushes 42.

The brushes 42 are disposed for respectively sliding against the surfaces of the slip rings 41, in a condition of being pressed toward the shaft 31 of the rotor 30. The brushes 42 supply a flow of DC current to the field winding 33 through the slip rings 41. The regulator 43 is an apparatus which adjusts the output voltage of the rotary electric machine 1 by controlling the field current If that flows in the field winding 33.

As shown in FIG. 7, the regulator 43 is a switching circuit having a switch element 431 and a return current diode 432. The switch element switch element 431 is connected in series with the field winding 33. The switch element 431 is a MOSFET. The return current diode 432 is connected in parallel with the field winding 33. The return current diode 432 is a diode having the anode connected to the drain electrode of the switch element 431 and the cathode connected to the positive-polarity supply voltage terminal. When switched on, the regulator 43 becomes supplied with current from an external power source of power. Thereafter, when the switch element 431 is set to the off state, the regulator 43 discharges the magnetic energy stored in the field winding 33 externally, as current that passes through the return current diode 432.

A capacitor 44 is connected in parallel with the regulator 43. Specifically, the capacitor 44 is connected between the cathode of the return current diode 432 and the source electrode of the switch element 431. The capacitor 44 stores electrical energy, and also outputs the stored electrical energy as current. The capacitor 44 has a function of suppressing variations in the field voltage of the field winding 33.

The field winding power supply apparatus 40 also has a control section 45, which is mainly configured of a microcomputer. Specifically, the control section 45 is configured as a computer, having for example a CPU, semiconductor memory such as RAM and ROM, etc, I/O units, etc. The semiconductor memory corresponds to a non-transitory tangible storage medium, from which the computer can read. The control section 45 reads out a program, stored for example in the semiconductor memory, and the CPU executes processing that is defined by the program code. The control section 45 thereby provides prescribed control functions. It should be noted that other methods of providing functions could be utilized, and that a technical scope of the present disclosure is not limited to a software-based method. As an example of other methods, it would be possible to employ hardware utilizing integrated circuits, logic circuits, etc. The control section 45 is connected to the switch element 431. The control section 45 controls the flow of field current If in the field winding 33, by controlling on/off switching of the switch element 431. In this way, the control section 45 adjusts the output voltage of the rotary electric machine 1, determined by the regulator 43. During each period that is controlled by the switch element 431, the control section 45 controls the ratio (referred to hereinafter as the field duty ratio) of the ON times of the switch element 431, for enabling a flow of field current. In this way, the control section 45 controls the field current If of the field winding 33. The field duty ratio corresponds approximately to the ratio (ON period)/((ON period)+(OFF period)) of the switch element 431.

The rectifier apparatus 50 is electrically connected to the stator windings 22 of the stator 20. The rectifier apparatus 50 is an apparatus which rectifies an AC current produced by the stator windings 22, to output a DC current. The rectifier apparatus 50 is configured of a plurality of diodes (rectifier elements) 51. Pairs of the diodes 51 are provided respectively corresponding to the phases of the stator windings 22. The diodes 51 of each phase are connected in series between the power source terminals. In the following, a diode 51 that is connected to the positive power source terminal side is referred to as an upper diode 51*u*. A diode 51 that is connected to the negative power source terminal side is referred to as a lower diode 51*d*. First ends of the windings of each phase of the stator windings 22 are mutually connected in common, and the second ends are connected between the upper diodes 51*u* and the lower diodes 51*d*.

<Operation of Rotary Electric Machine>

With the rotary electric machine 1 of the present embodiment, having the above configuration, a rotational torque is applied to the pulley 36 from the vehicle engine, via a belt, etc. The rotary electric machine 1 thereby rotates the rotor 30 in a prescribed direction, through rotation of the shaft 31. With the rotary electric machine 1 in this condition, an excitation voltage is applied to the field winding 33 of the rotor 30 from the brushes 42 of the field winding power supply apparatus 40 through the slip rings 41. Excitation of the claw shaped poles 323*a*, 323*b* of the first pole core 32*a* and second pole core 32*b* of the field core 32 thereby occurs. As a result, alternating NS magnetic poles are formed along the circumferential direction of rotation of the rotor 30.

With the rotary electric machine 1, when NS magnetic poles become formed in the claw shaped poles 323*a*, 323*b*, a rotating magnetic field is applied to the stator windings 22 of the stator 20. As a result, an AC electromotive force is generated in the stator windings 22 The AC electromotive force generated in the stator windings 22 in the rotary electric machine 1 is rectified to DC through the rectifier apparatus 50, and supplied to a battery from the output terminals. Hence the rotary electric machine 1 can function as an electric generator for charging the battery, by means of electromotive force generated in the stator windings 22.

Furthermore in the rotary electric machine 1, the field core 32 is partially formed of a material having a low saturation magnetic flux. Specifically, the boss portions 321 and the disk portions 322 in the field core 32 are formed of a second material having a saturation magnetic flux which is lower than that of a first material, from which the claw shaped poles 323 are formed. Hence the field core 32 readily enters a magnetic saturation state when the field current If is set at a prescribed level. As a result, the permeance P of the magnetic circuit becomes reduced. Furthermore when the field current If is made higher than a prescribed value (the case in which the load is high) the field core 32 enters a high saturation state (supersaturated state). As a result of this, the circuit time constant becomes reduced (see FIG. 11). That is to say, the circuit time constant becomes short.

Figure 10:
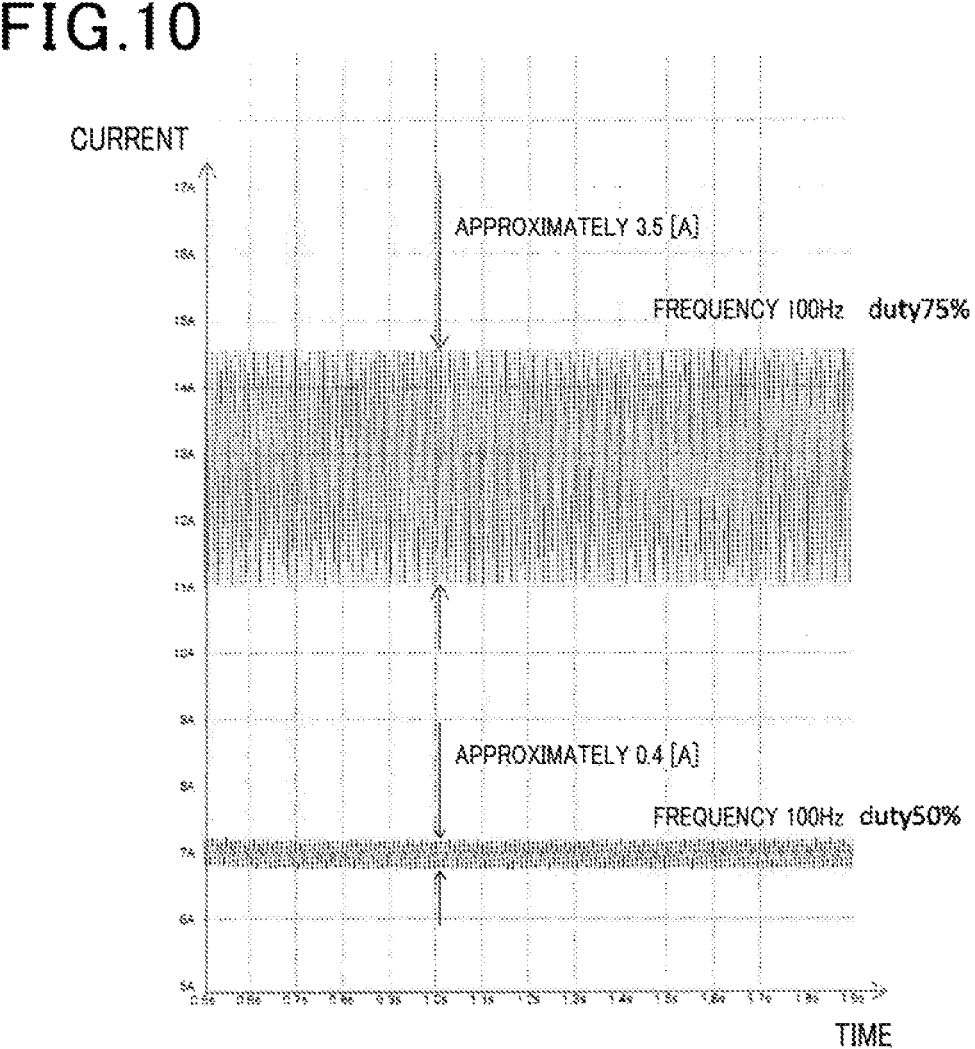
FIG. 10 is a diagram showing an example of a time-varying waveform of field current, with a comparison example.
Figure 11:
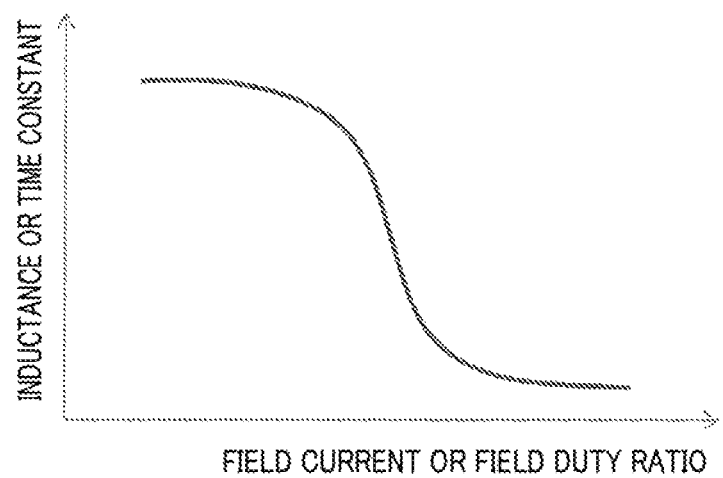
FIG. 11 is a diagram illustrating a relationship between field current or field duty ratio and inductance or time constant, for a rotor having a field winding.

If the switching frequency of the switch element 431 is low, in a state in which the circuit time constant of the magnetic circuit is small and the permeance P is small, then intense variations occur in the generated current. Intense variations in the generated voltage thus occur. For example, cases in which the field duty ratio is 50% and 75% can be supposed. That is to say, times at which the field current is relatively small and relatively large can be supposed. It will be assumed that the switching frequency is kept unchanged, (for example a switching frequency of 100 [Hz]). With such conditions, as shown in FIG. 10, the amplitude of variation of the current (approximately 3.5 [A]) when the field duty ratio is 75% is much greater than the amplitude variation (approximately 0.4 [A]) when the field duty ratio is 50%.

<Operation of Control Apparatus>

In the field winding power supply apparatus 40, which corresponds to the control apparatus of the present embodiment, the control section 45 has a predetermined relationship between the field current If and the switching frequency, stored beforehand in a semiconductor memory. Alternatively, a relationship between the field duty ratio and the switching frequency could be stored in the control section 45. The relationship between the field current If and the switching frequency is that the higher the field current If, the higher becomes the switching frequency. Alternatively, the relationship between the field duty ratio and the switching frequency, can be that the higher the field duty ratio, the higher becomes the switching frequency, in the same way as for the field current If. Specifically, the relationship that is held stored by the control section 45 is such that when the field current If or the field duty ratio is less than or equal to a threshold value, the switching frequency is set to a low value f2 (for example 100 [Hz]). On the other hand when the field current If or the field duty ratio is greater than a threshold value, the switching frequency is set to a high value f1 (for example 1000 [Hz]).

Figure 8:
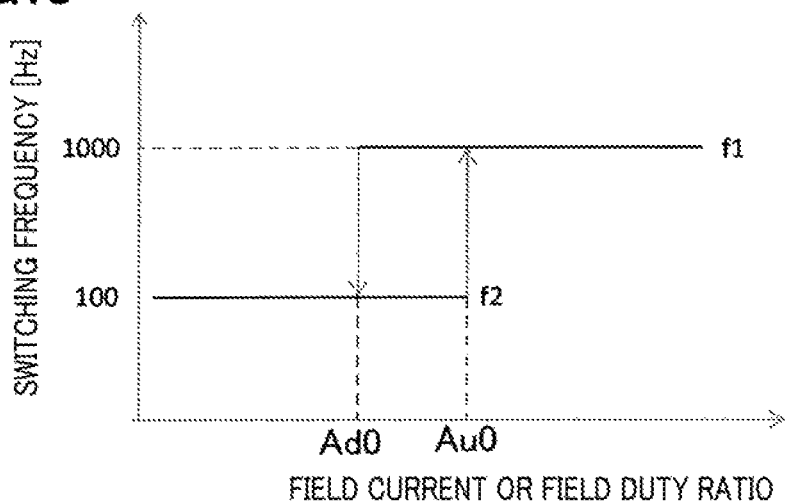
FIG. 8 is a diagram illustrating a relationship between field current or field duty ratio and switching frequency, with the control apparatus of the rotary electric machine of the first embodiment.

As shown in FIG. 8, the relationship between the field current If and the switching frequency has a hysteresis characteristic. The threshold value Ad0 is a first threshold value, for changeover from the switching frequency having the high value f1 to the low value f2. The threshold value Au0 on the other hand is a second threshold value, for changeover from the switching frequency having the low value f2 to the high value f1. The first threshold value Ad0 and the second threshold value Au0 are different from one another. Specifically, the first threshold value Ad0 is smaller than the second threshold value Au0. In this case, to change the switching frequency from the low value f2 to the high value f1, it is necessary for the field current If or the field duty ratio to become higher than the second threshold value Au0. On the other hand, to change the switching frequency from the high value f1 to the low value f2, it is necessary for the field current If or the field duty ratio to become lower than the first threshold value Ad0. Due to use of such a hysteresis characteristic, changeover hunting of the switching frequency, which can occur in the case of using a single threshold value when the field current If or the field duty ratio varies close to that threshold value, can be prevented. Occurrence of a voltage hunting phenomenon at these changeover timings can thereby be suppressed.

The control section 45 executes changeover of the switching frequency based on the above relationship between the field current If and the switching frequency. Specifically, when the field current If that flows in the field winding 33 is high, as a result of the field duty ratio applied by the switch element 431 for passing the field current, the control section 45 sets the switching frequency at the high value f1. Alternatively stated, the control section control section 45 sets the switching frequency at the high value f1 when the circuit time constant is small and the field core 32 is in a high saturation state (when a high load is applied). When the field current is small, due to the field duty ratio being small, the control section 45 sets the switching frequency at the low value f2. Alternatively stated, the control section control section 45 sets the switching frequency at the low value f2 when the circuit time constant large and the field core 32 is in a low saturation state (when a low load is applied). In this way, with the field winding power supply apparatus 40 of this embodiment, the control section 45 sets the switching frequency at the side of the field winding 33 to a higher value when the field current If is higher than a threshold value than when the field current If is lower than the threshold value.

With this configuration, the field winding power supply apparatus 40 of this embodiment sets the switching frequency to the high value f1 when there is a high saturation state (supersaturated state) in which the field current If is high and the circuit time constant is small. As a result, the field winding power supply apparatus 40 ensures stability of control of the field current If. The field winding power supply apparatus 40 thereby stabilizes control of the generated voltage. Furthermore with the field winding power supply apparatus 40, the switching frequency is set to the low value f2 when there is a low saturation state in which the field current If is small and the circuit time constant is large. As a result, the field winding power supply apparatus 40 can reduce switching losses, by lowering the switching frequency. Furthermore with the field winding power supply apparatus 40, the load on the switch element 431 is reduced, by reducing the occasions when heat is generated. The field winding power supply apparatus 40 also reduces noise emissions that are caused by field switching.

Figure 9:
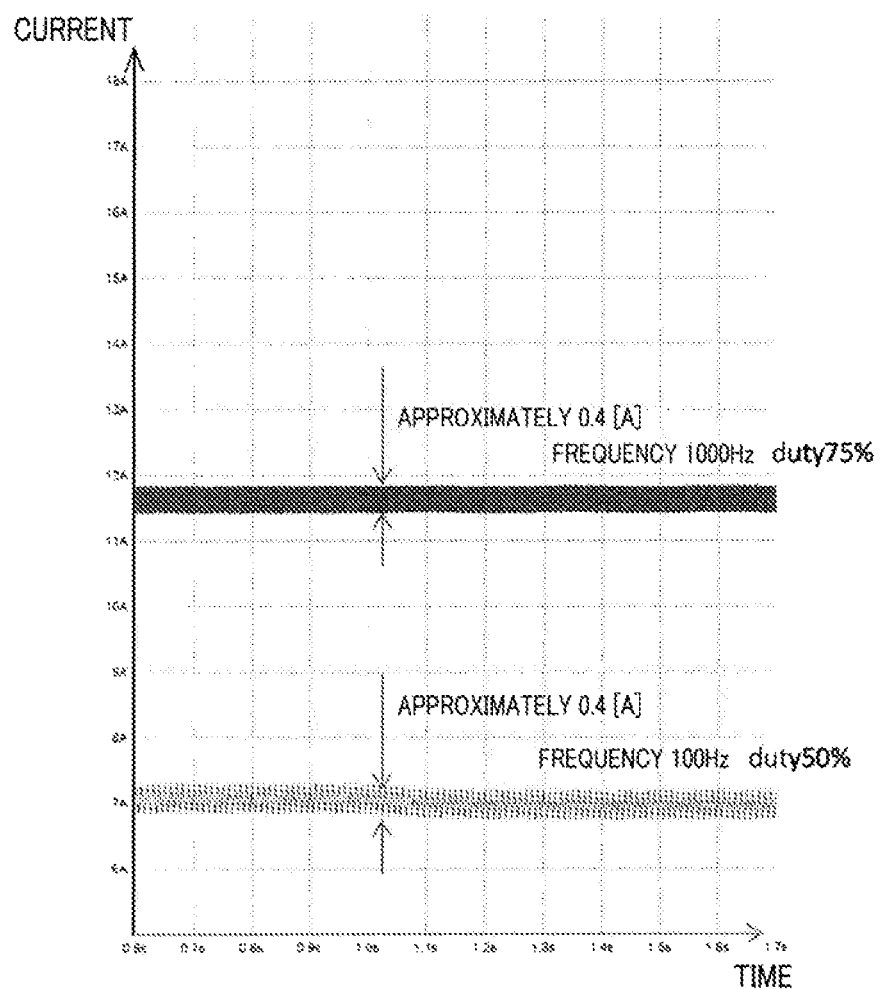
FIG. 9 is a diagram showing an example of a time-varying waveform of field current, with the control apparatus of the rotary electric machine of the first embodiment.

It will be assumed that when the field duty ratio is 50%, the switching frequency is set to the low value f2 (100 [Hz] in FIGS. 2, 8 and 9). It will further be assumed that when the field duty ratio is 75%, the switching frequency is set to the high value f1 (1000 [Hz] in FIGS. 8 and 9). Under such conditions, as shown in FIG. 9, the range of variation of current when the permeance P of the magnetic circuit is small and the field duty ratio is 75% is equal to the range of variation of current (approximately 0.4 [A]) when the permeance P is large and the field duty ratio is 50%. In this way, the field winding power supply apparatus 40 performs changeover of the switching frequency in accordance with the field current or the field duty ratio. Due to this configuration, the control section 45 can restrict the range of variation of current when the field duty ratio is 75%, to approximately $\frac{1}{10}$ of the range of variation for the case of a configuration in which changeover of the switching frequency is not performed.

<Operation and Effects>

With the rotary electric machine 1 of this embodiment, two magnet magnetic circuits are formed by the magnetic force of permanent magnets 34 that are respectively disposed between claw shaped poles 323 which are adjacent to one another in the circumferential direction of rotation of the rotor 30. Specifically, a first magnet magnetic circuit 62 is formed through which magnetic flux flows that is interlinked with the stator 20, and a second magnet magnetic circuit 63 is formed through which magnetic flux flows via the boss portions 321, with the circuit being completed within the rotor 30. Furthermore with the rotary electric machine 1 of this embodiment, a d-axis magnetic circuit 60 is formed when a load is applied to the rotor 30. Here, the phrase "when a load is applied to the rotor 30" signifies a condition in which a field current If is being passed through the field winding 33. In the d-axis magnetic circuit 60, the magnetic flux that is formed by the magnetomotive force of the field winding 33 flows in a path through the boss portions 321, the disk portions 322, a pair of claw shaped poles 323, and the stator core 21. At that time, of the two magnet magnetic circuits 62 and 63, the magnet magnetic flux that passes through the second magnet magnetic circuit 63 flows in the opposite direction to the magnetic flux that passes through the d-axis magnetic circuit 60. Hence this is a condition in which it is difficult for magnetic flux to flow, due to high reluctance presented to the flow.

With the rotary electric machine 1 of this embodiment, the permeance Prt of the d-axis magnetic circuit 60 and the permeance Pst of the q-axis magnetic circuit 61 are set such that when a load is applied to the rotor 30, the relationship Pst>Prt is satisfied. That is to say, the permeance Prt of the d-axis magnetic circuit 60 is made smaller than the permeance Pst of the q-axis magnetic circuit of the q-axis magnetic circuit 61. As a result, of the two magnet magnetic circuits 62 and 63, the magnetic flux in the first magnet magnetic circuit 62 is increased. Hence with the rotary electric machine 1 of this embodiment, the generated electric power can be greatly increased, by effectively utilizing magnet magnetic flux.

Furthermore the field winding power supply apparatus 40 of this embodiment, which corresponds to a control apparatus of the rotary electric machine 1, has a regulator 43 which controls the excitation of the field winding 33 and a control section 45 which controls the field current If that flows in the field winding 33. The control section 45 controls the field current If by controlling the on/off switching of the switch element 431 of the regulator 43. When the field current or field duty ratio is greater than a threshold value, the control section 45 sets the switching frequency of the switch element 431 to a value that is higher than when the field current or field duty ratio is lower than the threshold value. Specifically, the switching frequency is set to a high value f1 when the field current or field duty ratio is relatively large. Furthermore the switching frequency is set to a low value f2 when the field current or field duty ratio is relatively small. In a case in which the circuit time constant of the magnetic circuit is small and the permeance P is small, if the switching frequency of the switch element 431 is made low, then intense variations occur in the current. However with the control section 45, the switching frequency at the field winding 33 side is made higher when the field current If exceeds the threshold value than when the field current If is less than or equal to the threshold value. As a result, the field winding power supply apparatus 40 can ensure stability of control of the field current If, in a high saturation state (supersaturated state) in which the field current If is high and the circuit time constant is small. Furthermore in a low saturation state, in which the field current If is low and the circuit time constant is large, switching losses can be reduced by lowering the switching frequency. Moreover the field winding power supply apparatus 40 can ensure a lowering of noise emissions that are caused by field switching.

Furthermore with the field winding power supply apparatus 40 of this embodiment, the relationship between the field current or field duty ratio and the switching frequency has a hysteresis characteristic. The first threshold value Ad0 is a threshold value of field current or field duty ratio for changeover of the switching frequency from a high value f1 to a low value f2. On the other hand the second threshold value Au0 is a threshold value of field current or field duty ratio for changeover of the switching frequency from the low value f2 to the high value f1. Ad0 is made small by comparison with Au0. That is to say, for the switching frequency to change from the low value f2 to the high value f1, it is necessary for the field current or field duty ratio to become greater than the second threshold value Au0. On the other hand, for the switching frequency to change from the high value f1 to the low value f2, it is necessary for the field current or field duty ratio to become less than the first threshold value Ad0. Due to such a hysteresis characteristic, the field winding power supply apparatus 40 of this embodiment can prevent occurrence of changeover hunting of the switching frequency, caused by variation of the field current or field duty ratio close to a threshold value. Occurrence of voltage hunting at these changeover timings can thereby be prevented Hence the rotary electric machine 1 of the embodiment can provide increased stability of control. As a result, it becomes possible to prevent instability of controlling vehicle-installed electrical equipment that is a power supply destination.

Furthermore in the field winding power supply apparatus 40 of this embodiment, the regulator 43, which controls the field current that flows in the field winding 33, has a switch element 431 and a return current diode 432. The switch element 431 is connected in series with the field winding 33. The return current diode 432 is connected in parallel with the field winding 33. In this way, the magnetic energy stored in the field winding 33 is discharged externally as current, via the return current diode 432. Hence while the switch element 431 is in the off state, the output voltage of the regulator 43 of the rotary electric machine 1 is held unchanged.

Furthermore in the field winding power supply apparatus 40 of this embodiment, the switch element 431 of the regulator 43 is a MOSFET. As a result, with the field winding power supply apparatus 40 of this embodiment, losses which occur when a current is passed can be reduced, by comparison with the case in which the switch element 431 is a bipolar device such as an IGBT (insulated gate bipolar transistor). Hence since compatibility with high-speed switching can be achieved, changeover of the switching frequency can be suitably performed.

Furthermore a capacitor 44 is provided in the field winding power supply apparatus 40 of the present embodiment, connected in parallel with the regulator 43. The capacitor 44 stores electrical energy, and outputs the stored electrical energy as electric current. The field winding power supply apparatus 40 of this embodiment thereby suppresses variations in the field voltage of the field winding 33. Hence the field voltage is stabilized. Furthermore with the field winding power supply apparatus 40 of this embodiment, noise emissions due to field switching can be reduced.

The technology of the present disclosure is not limited to the contents of the above embodiment. For example the technology may be changed within a technological range that does not depart from the gist of the disclosure. Specifically, the following changes could be effected.

Second Embodiment

Figure 12:
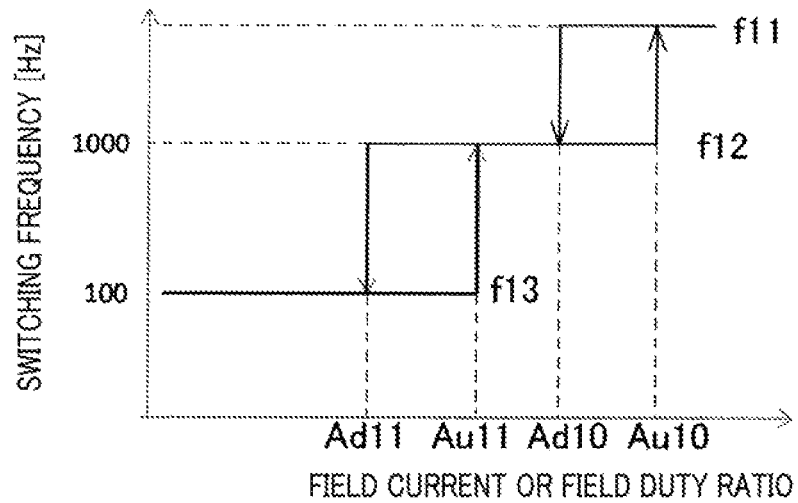
FIG. 12 is a diagram illustrating a relationship between field current or field duty ratio and switching frequency, with a control apparatus of a rotary electric machine according to a second embodiment.

A second embodiment will be described. In the following description, component elements that are identical to those of the first embodiment are designated by the same symbols as for the first embodiment, and description of these will be omitted. With the first embodiment, the control section 45 performs changeover of the switching frequency in accordance with the field current or field duty ratio. In doing this, the control section 45 changes over the switching frequency in two stages, high and low (f1 and f2 shown in FIG. 8). However the changeover of the switching frequency is not limited to this. It would be equally possible for the switching frequency to be changed over in 3 or more stages, for example. Alternatively, the changeover could proceed linearly. With the control section 45 of this embodiment as shown in FIG. 12, the control section 45 executes changeover of the switching frequency in three stages, high, medium and low (f11, f12, f13). With this configuration, the field winding power supply apparatus 40 of this embodiment can control changeover of the switching frequency in finer units. As a result, the field winding power supply apparatus 40 of this embodiment can both ensure stability of control of the field current when the circuit time constant is small, and also achieve a reduction of switching losses when the circuit time constant is large.

Furthermore as shown in FIG. 12, with the configuration of this embodiment, the relationship between the field current or field duty ratio and the switching frequency preferably has a hysteresis characteristic. The first threshold value Ad10 is a threshold value of the field current or field duty ratio for changeover of the switching frequency from a highest value f11 to a medium value f12. The second threshold value Au10 is a threshold value of the field current or field duty ratio for changeover of the switching frequency from the medium value f12 to the highest value f11. At that time, the first threshold value Ad10 is smaller than the second threshold value Au10. Similarly, the third threshold value Ad11 is a threshold value of the field current or field duty ratio for changeover of the switching frequency from the medium value f12 to a lowest value f13. The fourth threshold value Au11 is a threshold value of the field current or field duty ratio for changeover of the switching frequency from the lowest value f13 to the medium value f12. The third threshold value Ad11 is smaller than the fourth threshold value Au11. The fourth threshold value Au11 is preferably smaller than the first threshold value Ad10. Due to such a hysteresis characteristic, the field winding power supply apparatus 40 of this embodiment can suppress changeover hunting of the switching frequency, caused by variation of the field current or field duty ratio when close to a threshold value. The phenomenon of voltage hunting at the changeover timings can thus be prevented. Hence the rotary electric machine 1 of this embodiment can enhance the stability of control. As a result, instability in the operation of vehicle-installed electrical equipment that is the power supply destination can be prevented.

Third Embodiment

Figure 13:
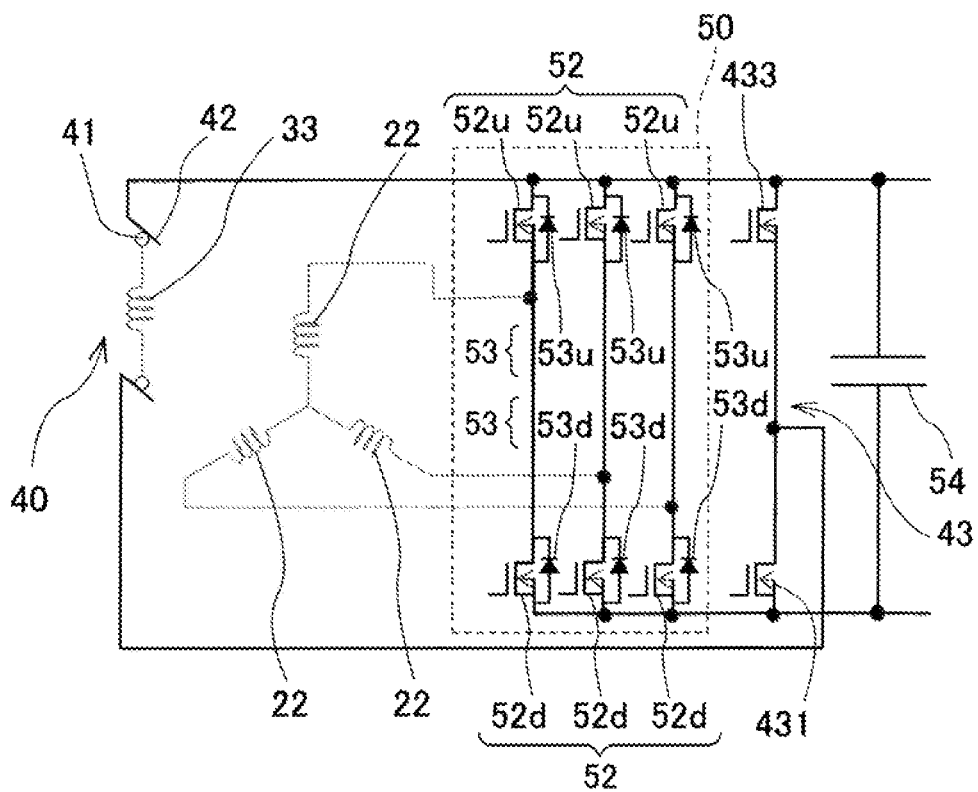
FIG. 13 is a circuit diagram of a control apparatus of a rotary electric machine according to a third embodiment.

A third embodiment will be described. In the following description, component elements that are identical to those of the first embodiment are designated by the same symbols as for the first embodiment, and description of these will be omitted. With the first embodiment, the field winding power supply apparatus 40 is provided with a return current diode 432 that is connected in parallel with the field winding 33 of the rotor 30, for discharging the magnetic energy stored in the field winding 33. However a technical scope of the present disclosure is not limited to such a configuration for discharging the energy. It would be equally possible for the energy discharging configuration to use a switch element 433 instead of the return current diode 432, for example, as shown in FIG. 13. The field winding power supply apparatus 40 of this embodiment has a switch element 431 that corresponds to a first switch element, and a switch element 433 that corresponds to a second switch element. In the field winding power supply apparatus 40 of this embodiment, the switch element 433 is connected in parallel with the field winding 33. The switch element 433 is a MOSFET that is controlled complementarily for conduction with the switch element 431, which is connected in series with the field winding 33. The regulator 43 is a synchronous rectifier circuit which performs complementary control of conduction by the switch elements 431 and 433. With this configuration, the field winding power supply apparatus 40 of this embodiment can reduce the conduction losses that occur when a reverse current flows, to a greater degree than with a configuration which uses the return current diode 432. Alternatively stated, there is a reduction of the conduction losses that occur when the magnetic energy stored in the field winding 33 is discharged as current. Hence, thermal stress is restrained.

With the first embodiment, the field winding power supply apparatus 40 is configured with a plurality of diodes 51 of the rectifier apparatus 50 connected in parallel with the stator windings 22. However the configuration of the rectifier apparatus 50 is not limited to this. It would be equally possible for the rectifier apparatus 50 to be configured as an inverter, as shown in FIG. 13. With the field winding power supply apparatus 40 of this embodiment, the rectifier apparatus 50 is configured with switch elements 52 and return current diodes 53 that are connected in parallel. Respective pairs of the switch elements 52 are provided for each of the phases of the stator windings 22. A return current diode 53 is connected in parallel with each of the switch elements 52. The switch elements 52 of each phase are connected in series between the power supply terminals. The return current diodes 53 of each phase are connected in series between the power source terminals. In the following, the switch elements 52 at the positive power supply side are designated as the upper switch elements 52u. The switch elements 52 at the negative power supply side are designated as the lower switch elements 52d. Furthermore the return current diodes 53 that are at the positive power supply side are designated as the upper return current diodes 53u. The return current diodes 53 that are at the negative power supply side are designated as the lower return current diodes 53d. The stator winding 22 of each phase has a first end connected in common to first ends of the stator windings of the other phases, and a second end that is connected to the junction between an upper switch element 52u and a lower switch element 52d. That is to say, the second end is connected to the junction between an upper return current diode 53u and a lower return current diode 53d.

The upper switch element 52u and the lower switch element 52d are complementarily controlled for conduction. The return current diodes 53 have the same function as that described for the diodes 51 of the above embodiment. With this configuration, the field winding power supply apparatus 40 of this embodiment can control the voltage applied to the stator windings 22 of each of the phases, by driving the switching operation of the switch elements 52 of the respective phases.

Modified Example

It would moreover be equally possible for the field winding power supply apparatus 40 to have the field winding 33, a switch element 431 (first switch element), and a return current diode 432 or a switch element (second switch element) 433, interposed between the power supply terminals of the rectifier apparatus 50, with the rectifier apparatus 50 configured as an inverter. With such a configuration of the field winding power supply apparatus 40, the field winding 33 and the switch element 433 are connected in parallel with one another, as shown in FIG. 13. Furthermore the switch element 431 is connected in series with the field winding 33. It would be equally possible for the field winding power supply apparatus 40 of this modified example, connected in this way, to have a configuration whereby it is connected in parallel with the rectifier apparatus 50, between the power supply terminals of the rectifier apparatus 50.

With this configuration of the field winding power supply apparatus 40 of this modified embodiment, the power supply for the field winding 33 is taken directly from the DC terminals of the inverter. Furthermore the circuitry at the field winding 33 side can be disposed close to the circuitry at the inverter side, or can be built into that circuitry. As a result of this, the field winding power supply apparatus 40 of this modified embodiment can enable a reduction of busbars, etc., and facilitates cooperative control at the field winding 33 side and the stator windings 22 side. Furthermore with this configuration, the field winding power supply apparatus 40 of this modified embodiment enables the capacitor 44 at the field winding 33 side to be shared as a capacitor at the inverter side, as exemplified by the shared use of the capacitor 54 shown in FIG. 13. With the field winding power supply apparatus 40 of this modified embodiment, a heat sink that cools the switch elements 431 and 433 can be shared as a heat sink that cools the switch elements 52. Furthermore a housing that accommodates the switch elements 431 and 433 can be shared as a housing that accommodates the switch elements 52. As a result, this modified example enables a compact overall configuration to be achieved for the rotary electric machine 1.

Furthermore in a field winding power supply apparatus 40 having the rectifier apparatus 50 configured as an inverter, the switching frequency of the switch element 431 that controls the current in the field winding 33 is preferably made lower than the switching frequency (control frequency) of an inverter that is constituted by the rectifier apparatus 50. That is to say, the highest value f1 of the switching frequency of the switch element 431 is preferably made lower than the switching frequency of the inverter. With such a configuration of the field winding power supply apparatus 40, electromagnetic interference with the inverter, caused by fields, can be prevented. Furthermore, switching losses at the field winding 33 side can be reduced. Hence the field winding power supply apparatus 40 of this modified example enables the thermal load on the inverter to be reduced. It should be noted that in general, the circuit time constant at the stator windings 22 side is small by comparison with the circuit time constant at the field winding 33 side. Hence even if the relationship Pst>Prt is established, the circuit time constant at the side of the field winding 33 will not become less than the circuit time constant of the stator windings 22. Thus, it is not necessary for the switching frequency of the field winding 33 to be made higher than the switching frequency of the stator windings 22. The field winding power supply apparatus 40 of this modified example therefore enables optimization of resources in the overall control system, and provides an economical control system.

Furthermore with the rotary electric machine 1 of the above embodiments, the field core 32 is configured of two types of material which have respectively different values of saturation magnetic flux density. The relationship between the permeance Prt of the d-axis magnetic circuit 60 and the permeance Pst of the q-axis magnetic circuit 61 when a load is acting on the rotor 30 (specifically, Pst>Prt) is set by this configuration. However the method of setting the relationship between the permeances Prt and Pst is not limited to this. As an example of an alternative method, it would be possible to form the field core 32 of a first type of material, having a high saturation magnetic flux density, and to set the relationship by adjusting the shape of the formed field core 32. When adjusting the shape at that time, the diameter of the boss portions 321 can be reduced such as to reduce at least part of the magnetic path cross-sectional area in the field core 32. Alternatively, the thickness of the disk portions 322 could be reduced such as to reduce at least a part of the magnetic path cross-sectional area in the field core 32, for example.

With such a configuration of the rotary electric machine 1, the relationship between the permeances Prt and Pst is established by adjusting a part dimension of the field core 32. Hence with the rotary electric machine 1 of this modified example, the manufacturing quality is stabilized. Furthermore the relationship between the permeances Prt and Pst is established by using a simple method. Moreover with the rotary electric machine 1 of this modified example, a high saturation magnetic flux can be maintained in those the parts of the magnetic circuit (the claw shaped poles 323) where it is required to maintain a high permeance P (high permeability), while the permeance P of other parts (the boss portions 321 or the disk portions 322) can be altered locally. Hence the effects on performance can be kept extremely small.

Furthermore in the field winding power supply apparatus 40 of the above embodiments, the switch element 431 of the regulator 43 is a MOSFET. It is preferable to use a MOSFET as the switch element 431, from the aspect of lowering conduction losses. However it would be equally possible to use a bipolar devices such as an IGBT, for example, as the switch element 431. That is also true for the switch element 433.

Furthermore with the above embodiments, an example of applying the rotary electric machine 1 as a generator motor for a vehicle has been described. However for use with a vehicle, the rotary electric machine 1 could be applied as an electric generator, as an electric motor, or as a rotary electric machine that can be selectively used as an electric generator or an electric motor.

What is claimed is:

1. A control apparatus for a rotary electric machine which has a stator and a rotor, the stator being of annular form and comprising a stator core with stator windings wound thereon, and the rotor being disposed radially inside and facing the stator,
    the rotor having a field core, a field winding, and permanent magnets,
    the field core having boss portions, disk portions extending radially outward from axial-direction end parts of the boss portions, and a plurality of claw shaped poles extending in the axial direction from radial-direction tip parts of the disk portions, disposed radially outwardly of the boss portions and formed with magnetic poles that mutually alternate in polarity along a circumferential direction of rotation,
    the field winding being disposed between the boss portions and the claw shaped poles, and being responsive to excitation for generating a magnetomotive force, and
    each of the permanent magnets being disposed between a pair of the claw shaped poles that are mutually adjacent with respect to the circumferential direction of rotation, with an axis of easy magnetization oriented in the circumferential direction of rotation, and with the permanent magnet being magnetized with polarities that coincide with polarities that are produced in the pair of claw shaped poles through excitation by the field winding;
    and the rotor having a d-axis magnetic circuit that passes through the disk portions, the claw shaped poles and the stator core and in which flows a magnetic flux that is produced by the excitation by the field winding, and a magnet magnetic circuit in which flows a magnetic flux that is produced by the magnetic force of the permanent magnets, with the d-axis magnetic circuit and the magnet magnetic circuit having, at least in part, a shared circuit portion that is common to both;
    wherein:
    the permeance Pst of a q-axis magnetic circuit that is positioned at an electrical angle differing by 90° from the d-axis and in which flows a magnetic flux that is formed during excitation of the stator windings, and the permeance Prt of the d-axis magnetic circuit, are set such as to establish a relationship Pst>Prt when a load is being applied to the rotor; and,
    the control apparatus comprises:
    a switching circuit which controls the excitation of the field winding, and
    a control section which makes a switching frequency of changeover between on and off conditions of the switching circuit become higher when the field current is above a threshold value than when the field current is less than or equal to the threshold value.

2. The control apparatus for a rotary electric machine according to claim 1, wherein:
    the threshold value comprises a first threshold value for changing the switching frequency from a high value to a low value, and a second threshold value for changing the switching frequency from the low value to the high value; and
    the first threshold value is smaller than the second threshold value.

3. The control apparatus for a rotary electric machine according to claim 1, wherein the switching circuit comprises a switch element connected in series with the field winding, and a reverse current diode connected in parallel with the field winding.

4. The control apparatus for a rotary electric machine according to claim 1, wherein:
   the switching circuit comprises a first switch element connected in series with the field winding, and a second switch element connected in parallel with the field winding; and
   the switching circuit is a synchronous rectifier type of circuit which executes complementary control of conduction by the first switch element and the second switch element.

5. The control apparatus for a rotary electric machine according to claim 3, wherein
   the switch elements are MOSFETs.

6. The control apparatus for a rotary electric machine according to claim 4, wherein
   the switch elements are MOSFETs.

7. The control apparatus for a rotary electric machine according to claim 1, comprising
   a capacitor connected in parallel with the switching circuit.

8. The control apparatus for a rotary electric machine according to claim 1,
   wherein the stator windings are polyphase windings, the control apparatus comprising an inverter which controls conduction by the polyphase windings; and
   wherein the switching frequency of the switching circuit is lower than a frequency of on and off switching in the inverter.

9. The control apparatus for a rotary electric machine according to claim 8, wherein
   the switching circuit is connected in parallel between a positive terminal and a negative terminal of the inverter.

10. The control apparatus for a rotary electric machine according to claim 1, wherein
    the relationship between the permeance Pst of the q-axis magnetic circuit and the permeance Prt of the d-axis magnetic circuit is set by adjusting at least a part of a magnetic path cross-sectional area in the field core.

* * * * *